(12) United States Patent
Taufik et al.

(10) Patent No.: US 10,404,061 B2
(45) Date of Patent: Sep. 3, 2019

(54) MULTIPLE INPUT SINGLE OUTPUT DC-DC CONVERTER WITH EQUAL LOAD SHARING ON THE MULTIPLE INPUTS

(71) Applicant: Cal Poly Corporation, San Luis Obispo, CA (US)

(72) Inventors: Taufik Taufik, Santa Maria, CA (US); Owen Jong, San Jose, CA (US)

(*) Notice: Subject to any disclaimer, the term of this patent is extended or adjusted under 35 U.S.C. 154(b) by 413 days.

(21) Appl. No.: 15/214,893

(22) Filed: Jul. 20, 2016

(65) Prior Publication Data
US 2018/0026441 A1    Jan. 25, 2018

(51) Int. Cl.
*H02J 1/00* (2006.01)
*H02M 3/04* (2006.01)

(52) U.S. Cl.
CPC .............. *H02J 1/00* (2013.01); *H02M 3/04* (2013.01)

(58) Field of Classification Search
CPC ..................................... H02J 1/00; H02M 3/04
See application file for complete search history.

(56) References Cited

U.S. PATENT DOCUMENTS

| | | | | |
|---|---|---|---|---|
| 4,160,884 A | * | 7/1979 | Bishop | H04B 3/44 323/902 |
| 5,157,269 A | * | 10/1992 | Jordan | G05F 1/59 307/31 |
| 6,278,263 B1 | * | 8/2001 | Walters | G06F 1/28 323/272 |
| 6,414,470 B1 | * | 7/2002 | Liu | H02J 1/102 323/272 |
| 7,142,046 B1 | * | 11/2006 | Elbanhawy | H02J 1/108 327/543 |
| 8,085,015 B2 | * | 12/2011 | Lee | H02M 3/1584 323/213 |
| 8,587,276 B2 | * | 11/2013 | Lipcsei | H02M 3/156 323/271 |
| 8,957,660 B2 | * | 2/2015 | Chen | H02M 1/084 323/272 |
| 9,641,075 B2 | * | 5/2017 | Beier | H02M 3/158 |
| 2006/0017327 A1 | * | 1/2006 | Siri | G05F 1/67 307/43 |

(Continued)

OTHER PUBLICATIONS

Multiple-Input Single-Output Converter for Renewable Energy Sources, IEEE Pub from the 2012 IEEE Symposium on Industrial Electronics and Applications (ISIEA2012), Sep. 23-26, 2012, Bandung, Indonesia, 978-1-4673-3005-3/12, 2011 IEEE, pp. 130-135.

(Continued)

*Primary Examiner* — Pinping Sun

(57) ABSTRACT

A system, method and apparatus of balancing a direct current load across a multiple direct current power sources includes receiving multiple direct current inputs to the inputs of a multiple input, single output DC to DC converter. The output current of each one of the direct current inputs is compared to a reference current. The direct current inputs are adjusted in corresponding DC to DC converter modules until the output current of each one of the direct current inputs is equal to the reference current. The adjusted output of the DC to DC converter modules is combined to a single output current that can be output to supply the single output current to a load.

15 Claims, 15 Drawing Sheets

(56) References Cited

U.S. PATENT DOCUMENTS

| | | | | |
|---|---|---|---|---|
| 2009/0273241 A1* | 11/2009 | Gazit | ......................... | H02J 1/10 |
| | | | | 307/83 |
| 2009/0327786 A1* | 12/2009 | Carroll | ...................... | G06F 1/26 |
| | | | | 713/340 |
| 2010/0001702 A1* | 1/2010 | Tateishi | .............. | H02M 3/1588 |
| | | | | 323/282 |
| 2011/0204801 A1* | 8/2011 | Smith | ................ | H05B 33/0815 |
| | | | | 315/192 |
| 2012/0104863 A1* | 5/2012 | Yuan | ................. | H01L 31/02021 |
| | | | | 307/82 |
| 2013/0077363 A1* | 3/2013 | Shen | .................. | H05B 33/0815 |
| | | | | 363/78 |
| 2014/0265935 A1* | 9/2014 | Sadwick | ............ | H05B 33/0815 |
| | | | | 315/307 |
| 2014/0293658 A1* | 10/2014 | Cao | ................... | H02M 3/33576 |
| | | | | 363/21.02 |
| 2015/0256067 A1* | 9/2015 | Bayer | ..................... | H02M 1/08 |
| | | | | 323/282 |
| 2018/0335454 A1* | 11/2018 | Varsha | .............. | G01R 19/16538 |

OTHER PUBLICATIONS

Linear Technology LT8710 Product brochure, downloaded from www.linear.com on May 27, 2016, 44 pages.

\* cited by examiner

MULTIPLE INPUT SINGLE OUTPUT DC-DC CONVERTER WITH EQUAL LOAD SHARING ON THE MULTIPLE INPUTS

FIELD OF THE DISCLOSURE

The present disclosure relates generally to DC to DC converters, and more particularly, to methods and systems for scalable, multiple input DC to DC converters with equal load sharing on each of the multiple power sources to supply a single load.

BACKGROUND

There many types of DC to DC power converter circuits and systems. In a typical DC to DC power converter with multiple DC power sources the DC power converter circuit switches from one DC power source to another DC power source among the multiple DC power sources. However, the energy drawn from each of the multiple DC power sources can vary greatly due to the load on the DC power converter circuit when the corresponding one of the multiple DC power sources is being utilized.

It is in this context that the following embodiments arise.

SUMMARY

Broadly speaking, the present disclosure fills these needs by providing a multiple input, single output DC to DC converter system, method and apparatus. It should be appreciated that the present disclosure can be implemented in numerous ways, including as a process, an apparatus, a system, computer readable media, or a device. Several inventive embodiments of the present disclosure are described below.

One implementation provides a method of balancing a direct current load across a multiple direct current power sources includes receiving multiple direct current inputs of a multiple input, single output DC to DC converter. The output current of each one of the direct current inputs is compared to a reference current. The direct current inputs are adjusted in corresponding DC to DC converter modules until the output current of each one of the direct current inputs is equal to the reference current. The adjusted output of the DC to DC converter modules is combined to a single output current that can be output to supply the single output current to a load.

Adjusting the output current of the DC to DC converter modules include increasing the current output of at least one of the DC to DC converter modules when the output current of the adjusted DC to DC converter module is less than the reference current. Adjusting the output current of the DC to DC converter modules also includes decreasing the current output of at least one DC to DC converter module when the output current of the DC to DC converter module is greater than the reference current. No change is required when the output current of all of the DC to DC converter modules is equal to the reference current.

Adjusting the output current of the DC to DC converter modules can include adjusting the output current of more than one of the DC to DC converter modules substantially simultaneously. Adjusting the output current of the DC to DC converter modules can include adjusting a duty cycle of the DC to DC converter modules. By placing a current source connected to the mid-point of a output voltage feedback voltage divider. The duty cycle of a DC to DC converter module can be increased to increase the current output by pushing current into the mid-point from the current source. The duty cycle of a DC to DC converter module can be decreased to decrease the current output by pulling current from the mid-point to the current source.

The reference current can be equal to a preselected reference current or can be equal to the highest current output from one of the multiple DC power sources. The reference current can be equal to a proportion of the highest current output from one of the multiple DC power sources. The reference current can be equal to the single output current of the multiple input, single output divided by a total number of direct current inputs received in the multiple input, single output converter. The multiple direct current inputs can include at two or more direct current inputs and the multiple DC to DC converter modules includes a corresponding two or more DC to DC converter modules.

Another implementation provides a multiple direct current input, single direct current output converter system. The system includes multiple inputs corresponding to and coupled to multiple direct current input sources. Each of the multiple inputs is corresponding to end coupled to multiple DC to DC converter modules. The system also includes an output current sharing controller that is coupled by control lines to each of the DC to DC converter modules. The output current sharing controller includes a comparator for comparing an output current from each one of the DC to DC converter modules to a reference current and an adjusting circuit for determining a control signal for adjusting the output of each one of the DC to DC converter modules. The system also includes a combining module combining the outputs from each one of the DC to DC converter modules into a single output.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Several exemplary embodiments for a multiple input, single output, DC to DC power converter system, method and apparatus will now be described. It will be apparent to those skilled in the art that the present disclosure may be practiced without some or all of the specific details set forth herein.

A multiple input, single output DC to DC power converter allows a single power converter to provide sufficient power to supply a larger load and thus simplify supplying power to larger loads such as a home or a business while distributing that load across multiple DC (direct current) power sources.

Figure 1:
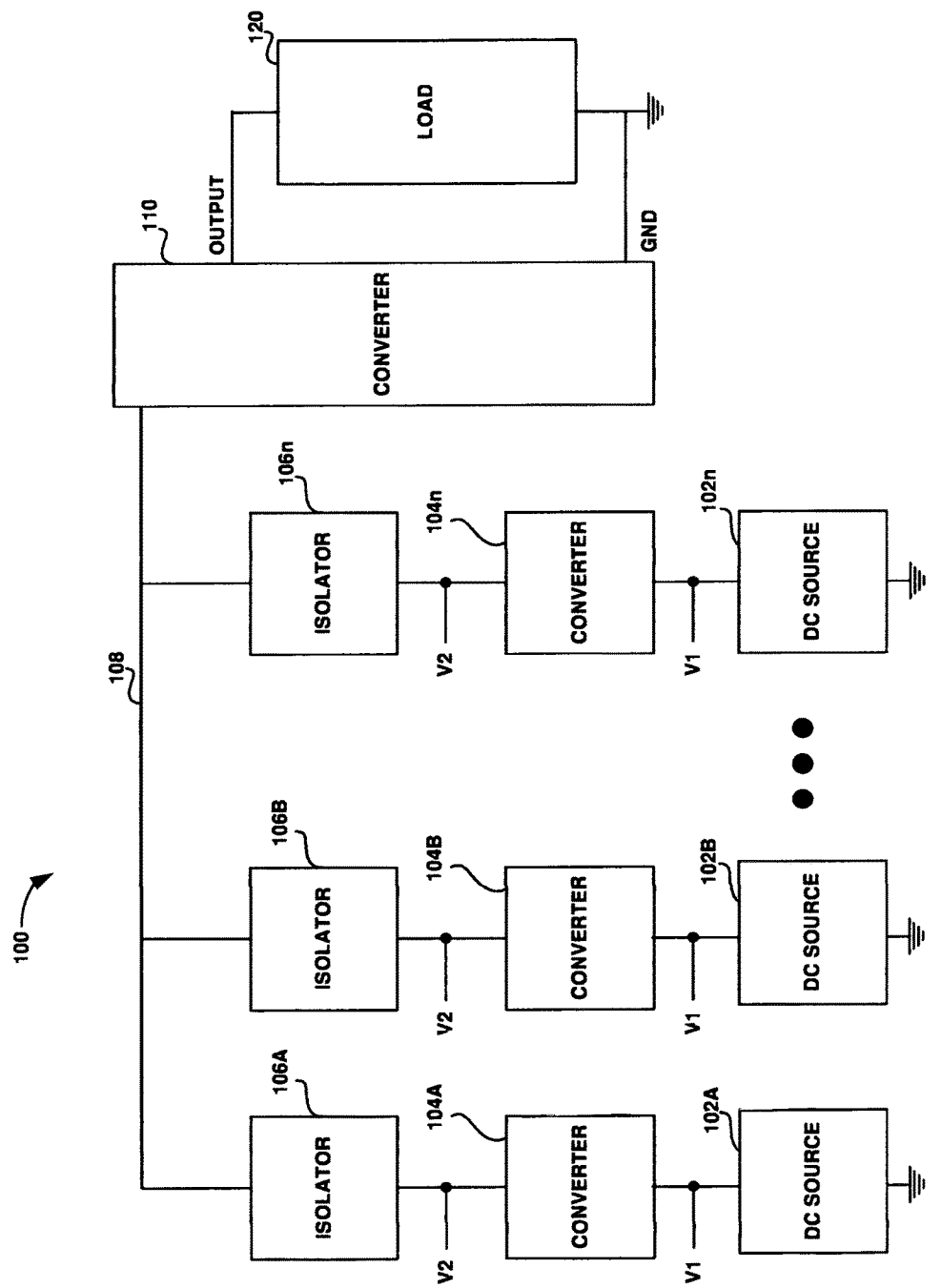
FIG. 1 is a typical multiple input, single output DC to DC power converter system.

FIG. 1 is a typical multiple input, single output DC to DC power converter system 100. The typical multiple input, single output DC to DC power converter system 100 includes multiple DC power sources 102A-n coupled to a single input of the DC to DC power converter. Each of the multiple DC power sources 102A-n include corresponding, individual converter circuits 104A-n and a corresponding isolation circuit 106A-n having an input coupled to the output of each of the individual converter circuits. Each of the individual converter circuits 104A-n convert the DC voltage output V1 from the corresponding DC source 102A-n to a selected DC voltage V2 that is different from V1.

Each of the isolation circuits 106A-n have an output coupled to a common power bus 108. The common power bus 108 is coupled to the single input of the single output DC power converter 110. The single output DC power converter 110 includes a ground reference terminal GND coupled to the ground potential. A load 120 is coupled between the OUTPUT terminal of the single output DC power converter 110 and the ground potential.

Unfortunately, the typical multiple input, single output DC to DC power converter system 100 cannot simultaneously and equally balance the load on each of the multiple DC power sources 102A-n due at least in part to the isolation circuits 106A-n. In operation, a first DC power source 102A will provide all of the power to the common power bus 108 until a voltage drop on the isolation circuits 104B is greater than the biasing voltage of the isolation circuit 104B. In that instance, the isolation circuit 104B will begin conducting power from a second DC power source 102B to the common power bus 108. This influx of power to the common power bus 108 can result in negatively biasing, i.e., shutting off, isolation circuit 104A thus isolating the first DC power source 102A.

The end result of the operation of the typical multiple input, single output DC to DC power converter system 100 is that the load 120 is not shared equally among the multiple DC power sources 102A-n at the same time and instead the load is shared sequentially over time. Switching the load from one of the multiple DC power sources 102A-n to another can cause voltage fluctuations, current fluctuations, noise and other undesirable signals in the output of the typical multiple input, single output DC to DC power converter system 100.

Figure 2:
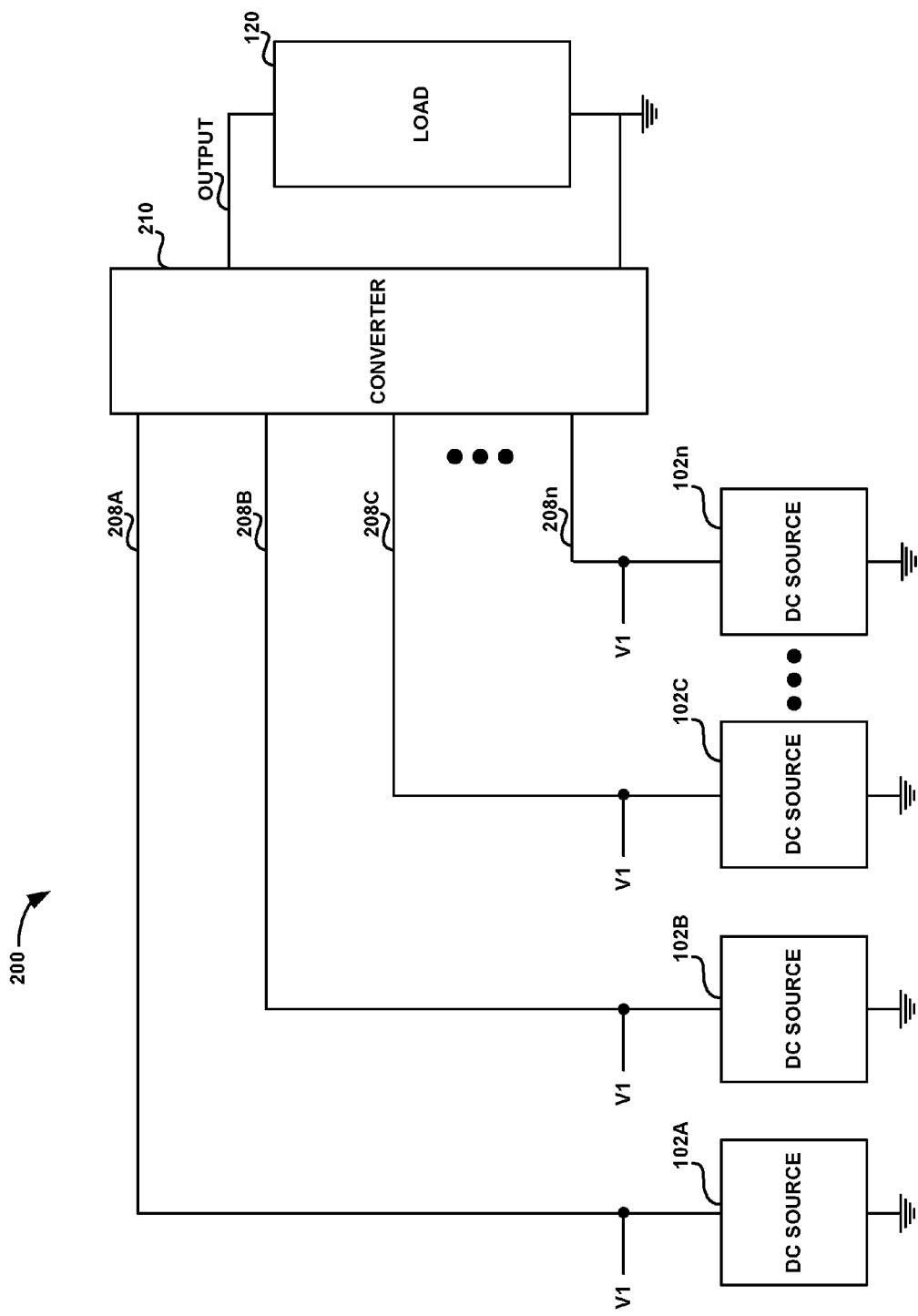
FIG. 2 is a simplified block diagram of a multiple input, single output DC to DC power converter system, for implementing embodiments of the present disclosure.

FIG. 2 is a simplified block diagram of a multiple input, single output DC to DC power converter system 200, for implementing embodiments of the present disclosure. The multiple input, single output DC to DC power converter system 200 includes multiple inputs 208A-n coupled to the output of each one of a corresponding multiple DC power sources 102A-n. A converter circuit 210 combines the power provided by the multiple DC power sources 102A-n to produce a single DC power output that is coupled to a load 120.

Figure 3:
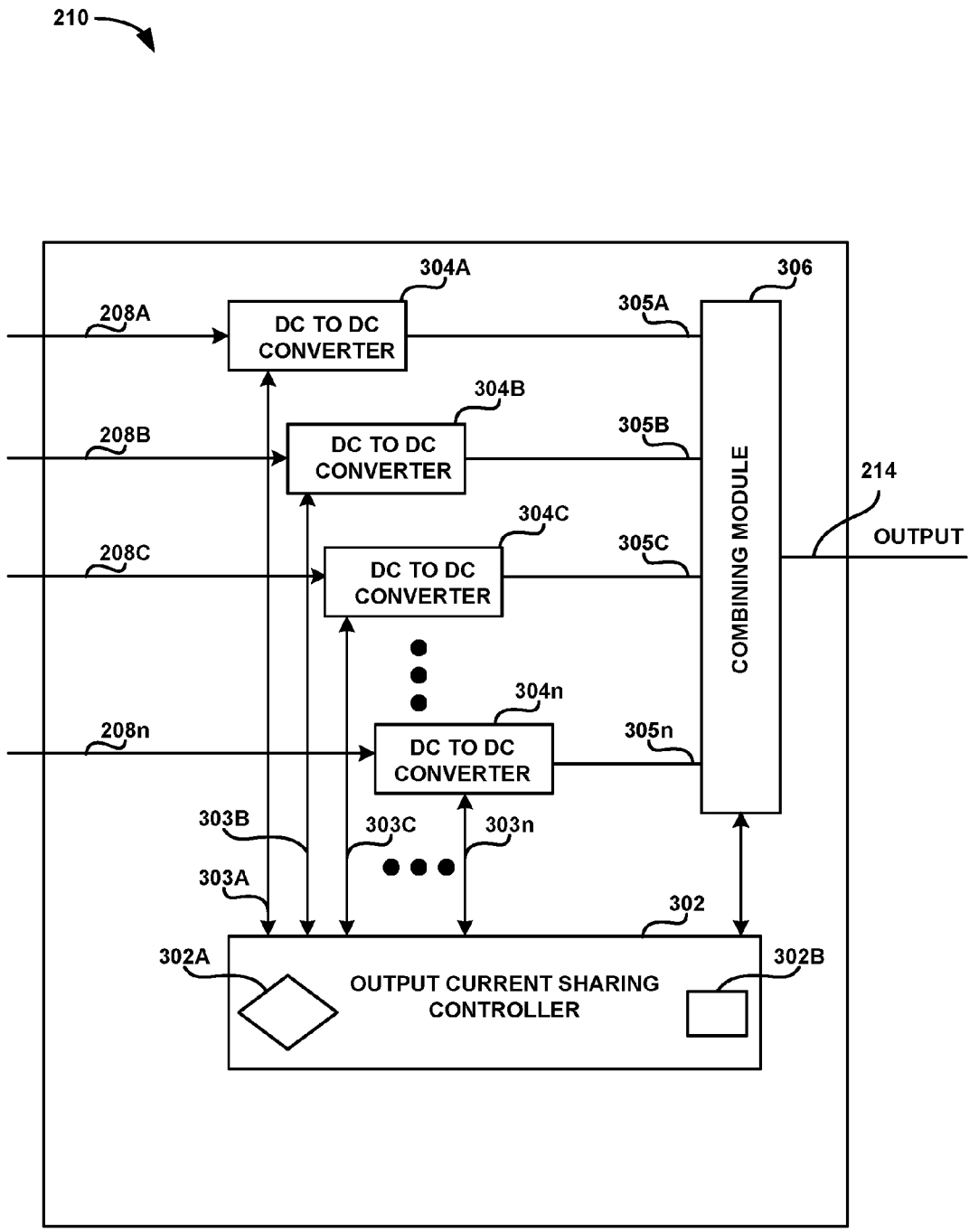
FIG. 3 is a block diagram of the converter circuit, for implementing embodiments of the present disclosure.

FIG. 3 is a block diagram of the converter circuit 210, for implementing embodiments of the present disclosure. The converter circuit 210 includes an output current sharing controller 302, a corresponding DC to DC converter modules 304A-n coupled to each one of the multiple inputs 208A-n and a combining module 306. The output current sharing controller 302 includes a signal line 303A-n coupled to a corresponding control signal input, e.g., a feedback input, for each one of the DC to DC converter modules 304-n.

The current sharing controller 302 also includes a comparator 302A for comparing output current from each one of the DC to DC converter modules 304A-n, as will be described in more detail below. The current sharing controller also includes a feedback circuit 302B for determining a feedback control signal for adjusting the output of each of the DC to DC converter modules 304A-n, as will be described in more detail below.

Each of the DC to DC converter modules 304A-n receive the respective input DC voltage and current from the corresponding DC power sources 102A-n and convert the input DC voltage and current to a selected output DC voltage and current. The DC to DC converter modules 304A-n also provide corresponding monitoring signals to the output current sharing controller 302 via the corresponding signal line 303A-n. In one implementation, the signal lines 303A-n can be combined in a single signal line between all of the DC to DC converter modules 304A-n and the output sharing controller 302. Alternatively, the signal lines 303A-n can be individual a single signal lines between each one of the DC to DC converter modules 304A-n and the output sharing controller 302. By way of example, the signal line 303A can include a first signal line from the output current sharing controller 302 to the input DC to DC converter module 304A and a second signal line from the DC to DC converter module 304B to the output current sharing controller 302.

The combining module 306 includes multiple inputs 305A-n corresponding to each one of the outputs of the DC to DC converter modules 304A-n. The combining module 306 has a single output 214 corresponding to the OUTPUT node of the converter circuit 210.

Figure 4:
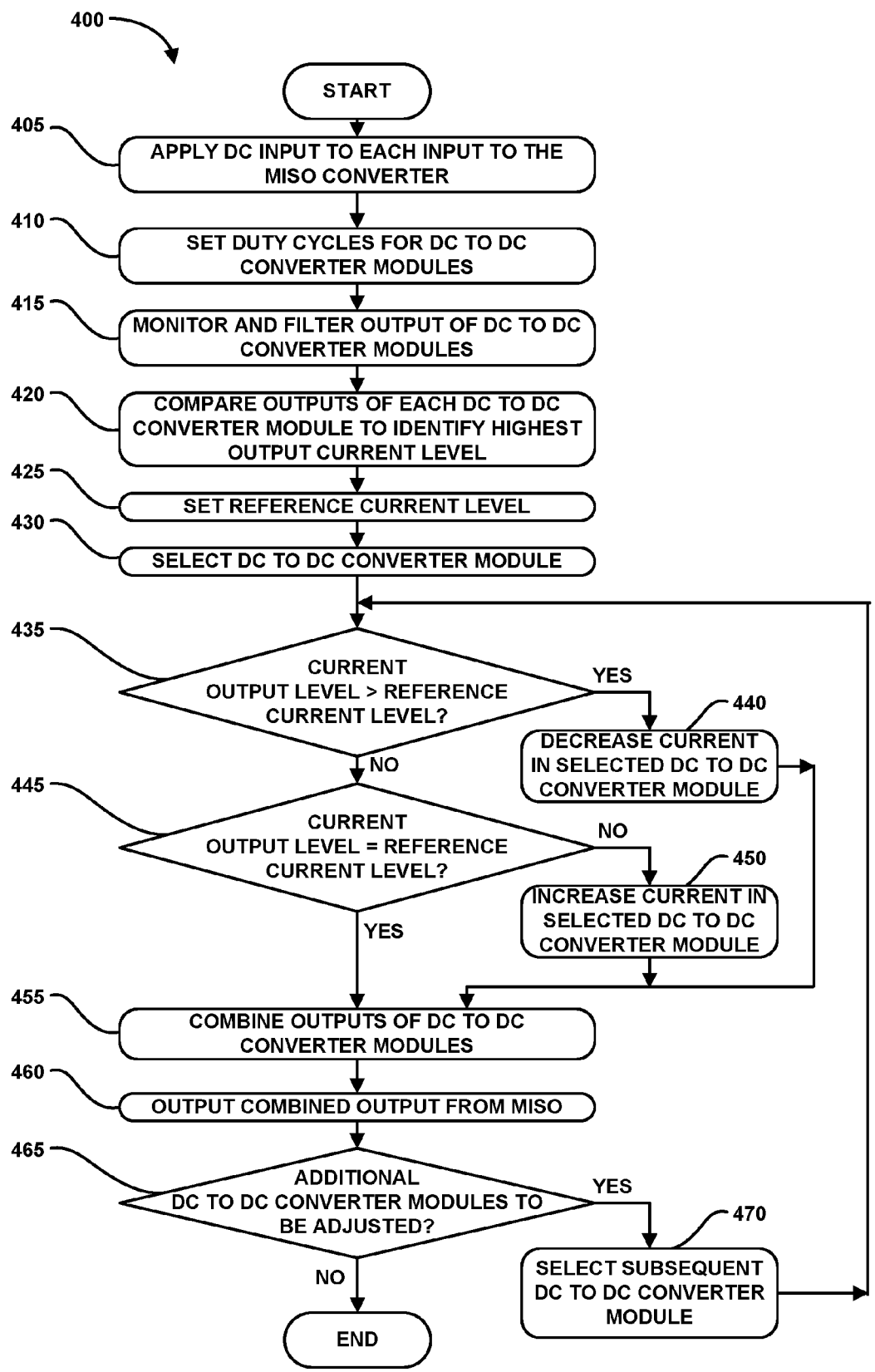
FIG. 4 is a flowchart diagram that illustrates the method operations performed in combining the outputs of each one of the multiple DC power sources to a single DC output in the multiple input, single output DC to DC power converter system, for implementing embodiments of the present disclosure.

FIG. 4 is a flowchart diagram that illustrates the method operations 400 performed in combining the outputs of each one of the multiple DC power sources 102A-n to a single DC output in the multiple input, single output DC to DC power converter system 200, for implementing embodiments of the present disclosure. The operations illustrated herein are by way of example, as it should be understood that some operations may have sub-operations and in other instances, certain operations described herein may not be included in the illustrated operations. With this in mind, the method and operations 400 will now be described.

In operation 405, a DC power is applied to each input 208A-n of the multiple input single output DC to DC converter 210. The corresponding DC to DC converter modules 304A-n convert the respective input voltage and current to a selected DC output voltage and current.

In operation 410, a duty cycle is selected for each one of the DC to DC converter modules 304A-n. The output current sharing controller 302 sends a duty cycle control signal to each one of the DC to DC converter modules 304A-n as a feedback signal. An initial duty cycle control signal can vary from 0% to 100% operation for each one of the DC to DC converter modules 304A-n. In one implementation, the initial duty cycle control signal for each one of the DC to DC converter modules 304A-n is based on a preselected initial duty cycle. In another implementation, the initial duty cycle control signal for each one of the DC to DC converter modules 304A-n can be based on a previous duty cycle for each one of the DC to DC converter modules.

In operation 415, each of the DC to DC converter modules 304A-n provide a monitoring output signal corresponding to the respective output current of each one of the DC to DC converter modules. The monitoring output signal is provided to the output current sharing controller 302 via the signal lines 303A-n. The monitoring signals can include a current, a voltage, impedance or other aspect of the power output from each one of the DC to DC converter modules 304A-n.

In operation 420, the output current sharing controller 302 utilizes the monitoring output signals received from the DC to DC converter modules 304A-n to compare and identify which of the DC to DC converter modules has the highest current output level.

In an operation 425, a reference current Iref level is selected. In one implementation, the reference current Iref level can be set to equal to the highest current output. In an alternative implementation, the reference current Iref level can be set to a preselected current level or a preselected portion of the highest current or any suitable combination thereof.

In an operation 430, one of the DC to DC converter modules 304A-n is selected by the output current sharing controller 302. In an operation 435, the current output level of the selected DC to DC converter module is compared to the reference current level in the comparator 302A. If the current output level of the selected DC to DC converter module is greater than the reference current Iref level then the method operations continue in an operation 440. In operation 440, the output current sharing controller 302 sends a feedback signal to the selected DC to DC converter module to decrease the current output from the selected DC to DC converter module, and the method operations continue in an operation 445.

In one implementation, the current output from the selected DC to DC converter module can be decreased by reducing the duty cycle of the selected DC to DC converter module. If the output current of the selected DC to DC converter module is not greater than the reference current Iref level in operation 435, then the method operations continue in operation 445. Duty cycle is defined herein to be the conduction time of the active switch used in the DC to DC converter, e.g., a MOSFET, to the switching period of the DC to DC converter. By way of example, if the MOSFET switches once per second and when the MOSFET conducts, the conduction time is 0.5 seconds, the duty cycle is 0.5/1.0=0.5=50 percent duty cycle.

In operation 445, the output of the selected DC to DC converter module is compared to the reference current Iref level to determine if the output of the selected DC to DC converter module is equal to the reference current Iref level. If the output of the selected DC to DC converter module is not equal to the reference current Iref level then the method operations continue in an operation 450. In operation 450, the output current sharing controller 302 sends a feedback signal to the selected DC to DC converter module to increase the current output from the selected DC to DC converter module, and the method operations continue in an operation 455.

In one implementation, the current output from the selected DC to DC converter module can be increased by increasing the duty cycle of the selected DC to DC converter module. If the output of the selected DC to DC converter module is equal to the reference current level in operation 445, then the method operations continue in operation 455.

In operation 455, the outputs of the DC to DC converter modules 304A-n are input to the combining module 306. The combining module 306, combines the outputs of the DC to DC converter modules 304A-n to produce a single output 214 that is coupled to a load 120 (as shown in FIG. 2 above), in an operation 460.

In an operation 465, the DC to DC converter modules 304A-n are examined to determine if additional adjustments of the outputs of the DC to DC converter modules are needed. If additional adjustments are needed then the method operations continue in operation 470 or a subsequent DC to DC converter module is selected and the method operations continue in operation 435, as described above. If no additional adjustments are needed then the method operations can end.

The respective outputs of each of the DC to DC converter modules 304A-n can be adjusted sequentially, as described in FIG. 4. However it should be noted that the respective outputs of each of the DC to DC converter modules 304A-n can be adjusted simultaneously and continuously, as will be described in FIG. 5.

Figure 5:
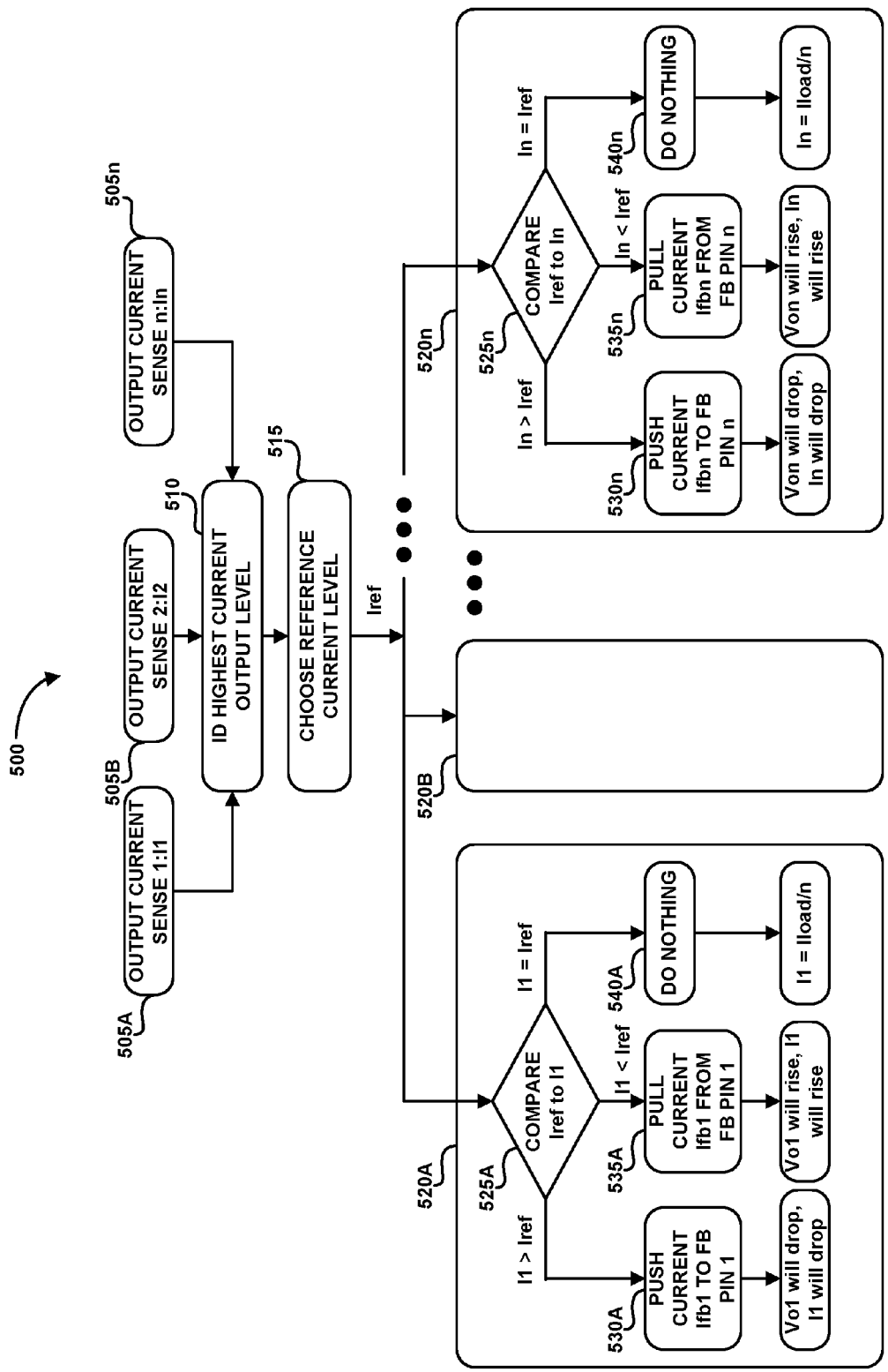
FIG. 5 is a flowchart diagram that illustrates the method operations 500 performed in combining the outputs of each one of the multiple DC power sources 102A-n to a single DC output, for implementing embodiments of the present disclosure.

FIG. 5 is a flowchart diagram that illustrates the method operations 500 performed in combining the outputs of each one of the multiple DC power sources 102A-n to a single DC output, for implementing embodiments of the present disclosure. The operations illustrated herein are by way of example, as it should be understood that some operations may have sub-operations and in other instances, certain operations described herein may not be included in the illustrated operations. With this in mind, the method and operations 500 will now be described.

A DC power is applied to each input 208A-n of the multiple input single output DC to DC converter 210. The corresponding DC to DC converter modules 304A-n convert, monitor and adjust the current supplied by each of the multiple DC power sources 102A-n. In simultaneous operations 505A-n, the output of each one of the DC to DC converter modules 304A-n is monitored to provide corresponding output monitoring signals to the output current sharing controller 302. The corresponding output monitoring signals can include a current, a voltage, an impedance or other aspect of the power output from each one of the DC to DC converter modules 304A-n.

In an operation 510, the output current sharing controller 302 utilizes the corresponding output monitoring signals from the DC to DC converter modules 304A-n to compare and identify which of the DC to DC converter modules has the highest current output level.

In an operation 515, a reference current Iref level is selected. The reference current Iref level can be set to equal to the highest current output level, in one implementation. In an alternative implementation, the reference current Iref level can be set to a preselected current level or a preselected portion of the highest current level or any suitable combination thereof.

In simultaneous operations 520A-n, each one of the DC to DC converter modules 304A-n is selected and adjusted. Simultaneous operations 520A-n include the following corresponding operations 525A-n, 530A-n and 535A-n.

In simultaneous operations 525A-n, the output current level of the selected DC to DC converter module is compared to the reference current Iref level. If the current output level of the selected DC to DC converter module is greater than the reference current Iref level then the method operations continue in corresponding operations 530A-n where the output current sharing controller 302 sends a feedback signal to the control or feedback (FB) pin of the respective DC to DC converter module to decrease the current output level from the respective DC to DC converter module. In one implementation, the output current is passed through a voltage divider to monitor the voltage drop corresponding to the current flow. The monitored voltage drop can be utilized as an output voltage level of the respective DC to DC converter module. Reducing the output current level results in a reduced output voltage of the selected DC to DC converter module.

If the output of the selected DC to DC converter module is less than the reference current then the method operations continue in corresponding operations 535A-n where the output current sharing controller 302 sends a feedback signal to the control or feedback (FB) pin of the respective DC to DC converter module to increase the current output level from the respective DC to DC converter module. As a result, the output voltage and the output current level of the selected DC to DC converter module will increase to a higher value.

If the output of the respective DC to DC converter module is equal to the reference current Iref level then the method operations continue in corresponding operations 540A-n where the output current sharing controller 302 sends a feedback signal to the control or feedback (FB) pin of the respective DC to DC converter module to make no changes to the current output level from the respective DC to DC converter module. As a result, the output voltage and the output current level of the respective DC to DC converter module will remain constant.

Figure 6:
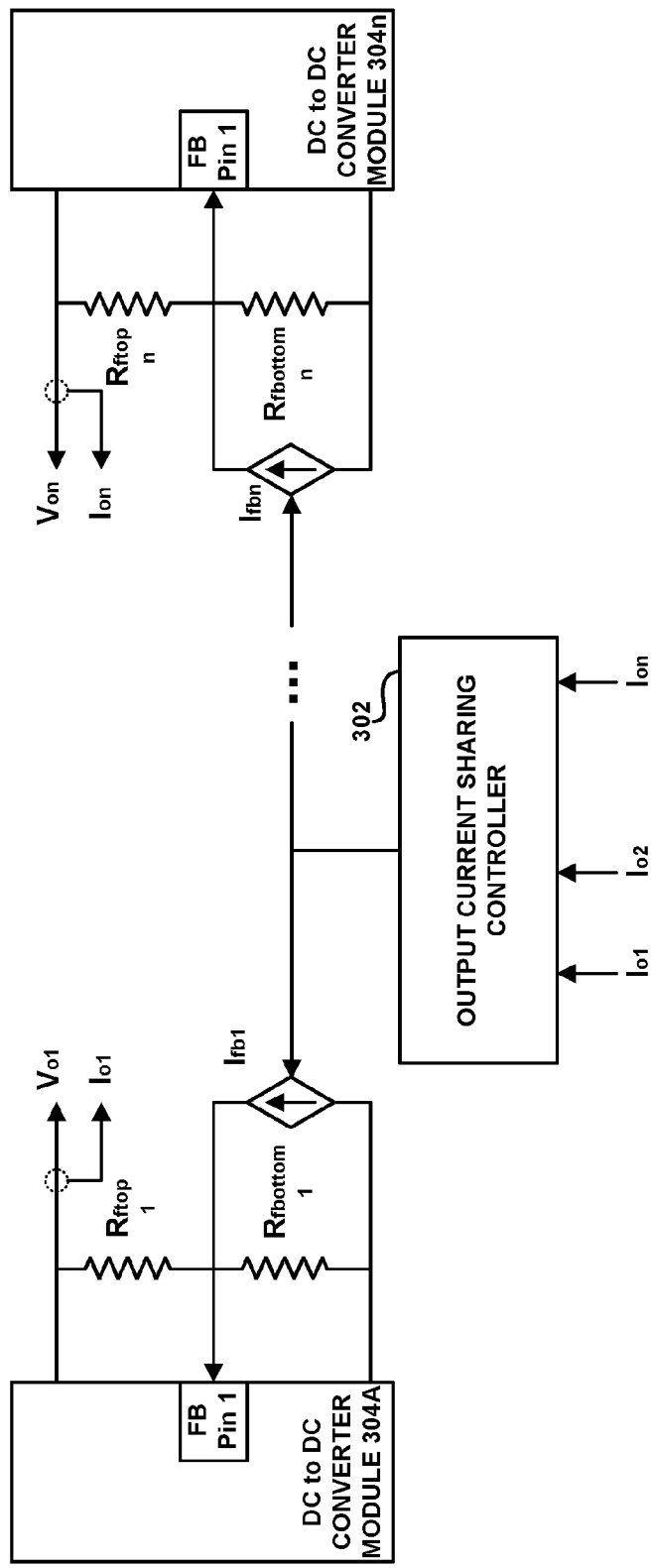
FIG. 6 is a simplified schematic diagram of the current and voltage monitoring, for implementing embodiments of the present disclosure.

FIG. 6 is a simplified schematic diagram of the current and voltage monitoring, for implementing embodiments of the present disclosure. The outputs of each one of the DC to DC converter modules 304A-n can be monitored by the output current sharing controller 302. An output current level and voltage level indication for each one of the DC to DC converter modules 304A-n can be determined by measuring the current flow and voltage using a series feedback reference resistor circuit including a top feedback reference resistor Rftbtop and a bottom feedback reference resistor Rftbtbottom.

The output current flow is measured in parallel with one of the feedback reference resistors. As illustrated, the output current flow is measured in parallel with the bottom feedback reference resistor Rftbtbottom, however, it should be understood that the output current flow could be measured in parallel with the top feedback reference resistor Rftbtop, in an alternative implementation.

The output voltage level can be measured across one or both of the feedback reference resistors Rftbtop, Rftbtbottom. As illustrated, the output voltage is measured across both of the feedback reference resistors, however, it should be understood that the output voltage could be measured across only the top feedback reference resistor Rftbtop or only the bottom feedback reference resistor Rftbtbottom.

Figures 7, 8:
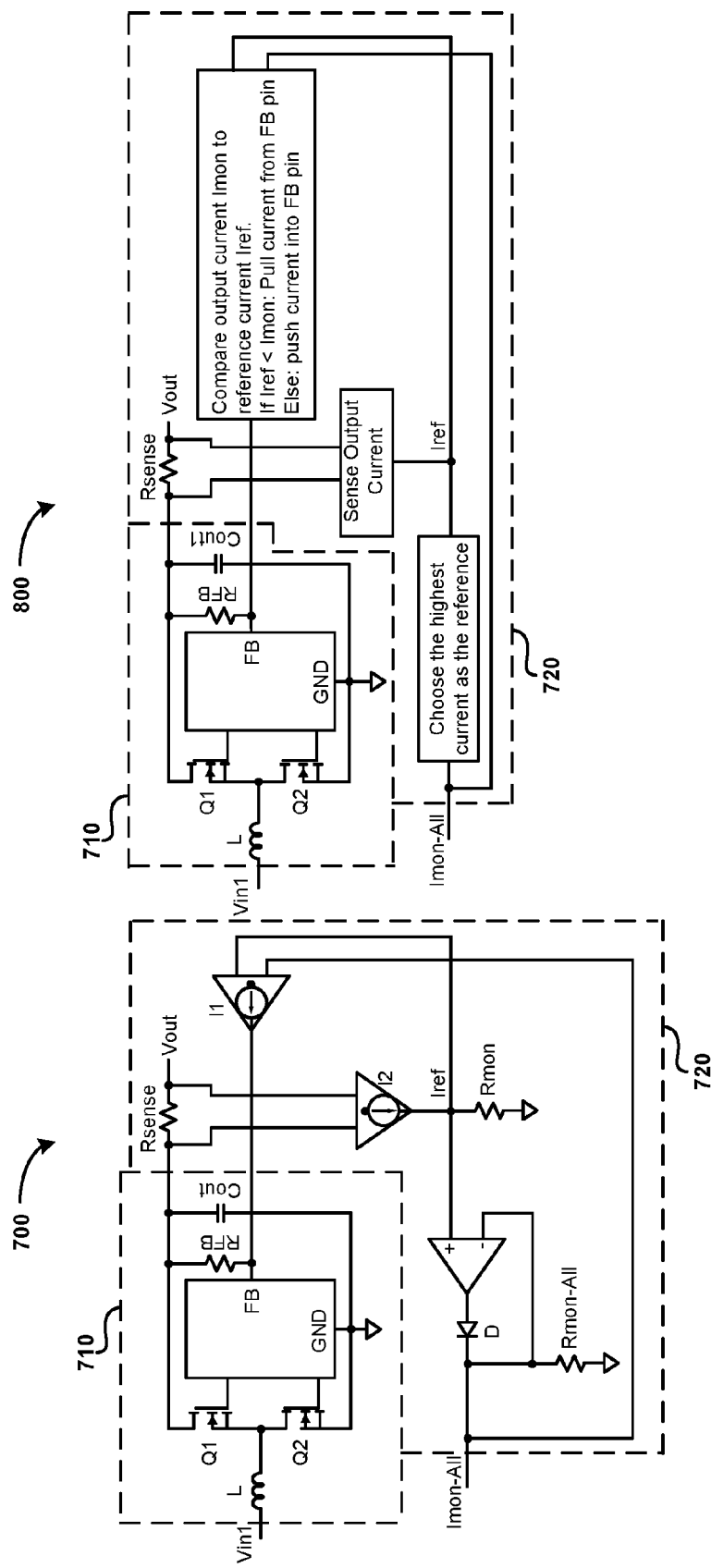
FIG. 7 is a simplified block diagram of a single input, DC to DC converter system 700, for implementing embodiments of the present disclosure
FIG. 8 is a simplified process flow diagram of the operations of the monitoring circuit, for implementing embodiments of the present disclosure.

FIG. 7 is a simplified block diagram of a single input, DC to DC converter system 700, for implementing embodiments of the present disclosure. The single input, DC to DC converter system 700 includes a DC to DC converter 710 and a monitoring circuit 720. The DC to DC converter 710 includes a controller U1 for controlling the power output of the output transistors Q1, Q2. The monitoring circuit 720 includes a comparator U2 for comparing the output current of the DC to DC converter 710 to a reference current Iref.

FIG. 8 is a simplified process flow diagram of the operations of the monitoring circuit 720, for implementing embodiments of the present disclosure. In operation, the DC to DC converter 710 receives the input power on the Vin1 node and the controller U1 controls the conduction of Q1 and Q2 to output the current through output node Vout. The monitoring circuit 720 senses the output current of the DC to DC converter 710 through resistor Rsense. The output current of the DC to DC converter 710 is compared to a reference current Iref. A difference between the output current of the DC to DC converter 710 and the reference current Iref results in a feedback signal to the controller U1. An increase output, e.g., a push current, feedback signal is output to the controller U1 when the output current of the DC to DC converter 710 is less than the reference current Iref. A decrease output, e.g., a pull current, feedback signal is output to the controller U1 when the output current of the DC to DC converter 710 is greater than the reference current Iref. A no change output, e.g., a constant current, feedback signal is output to the controller U1 when the output current of the DC to DC converter 710 is equal to the reference current Iref.

In most implementations, there will be more than one single input, DC to DC converter system 700 coupled in parallel to share the output load and provide the total output current to supply the demands of the load. When there are multiple single input, DC to DC converter systems 700 in parallel, the reference current Iref can be selected dynamically, in one implementation. Dynamically selecting the Iref allows the multiple, single input, DC to DC converter systems 700 to more evenly share the total output load. The monitoring circuit 720 includes a comparator circuit for comparing the individual output currents from all of the multiple, single input, DC to DC converter systems 700 to identify one of the individual output currents as the Iref. In one implementation, the highest, individual output current can be selected as Iref. In other implementations, one of the individual output currents that is not the highest output current is selected as Iref. By way of example, the second highest individual output current can be selected. In another implementation, Iref can be selected as a set value or a preselected percentage of the highest individual output current. The preceding are merely example implementations other implementations including selecting any one of the individual output currents could be selected as Iref.

Figure 9A:
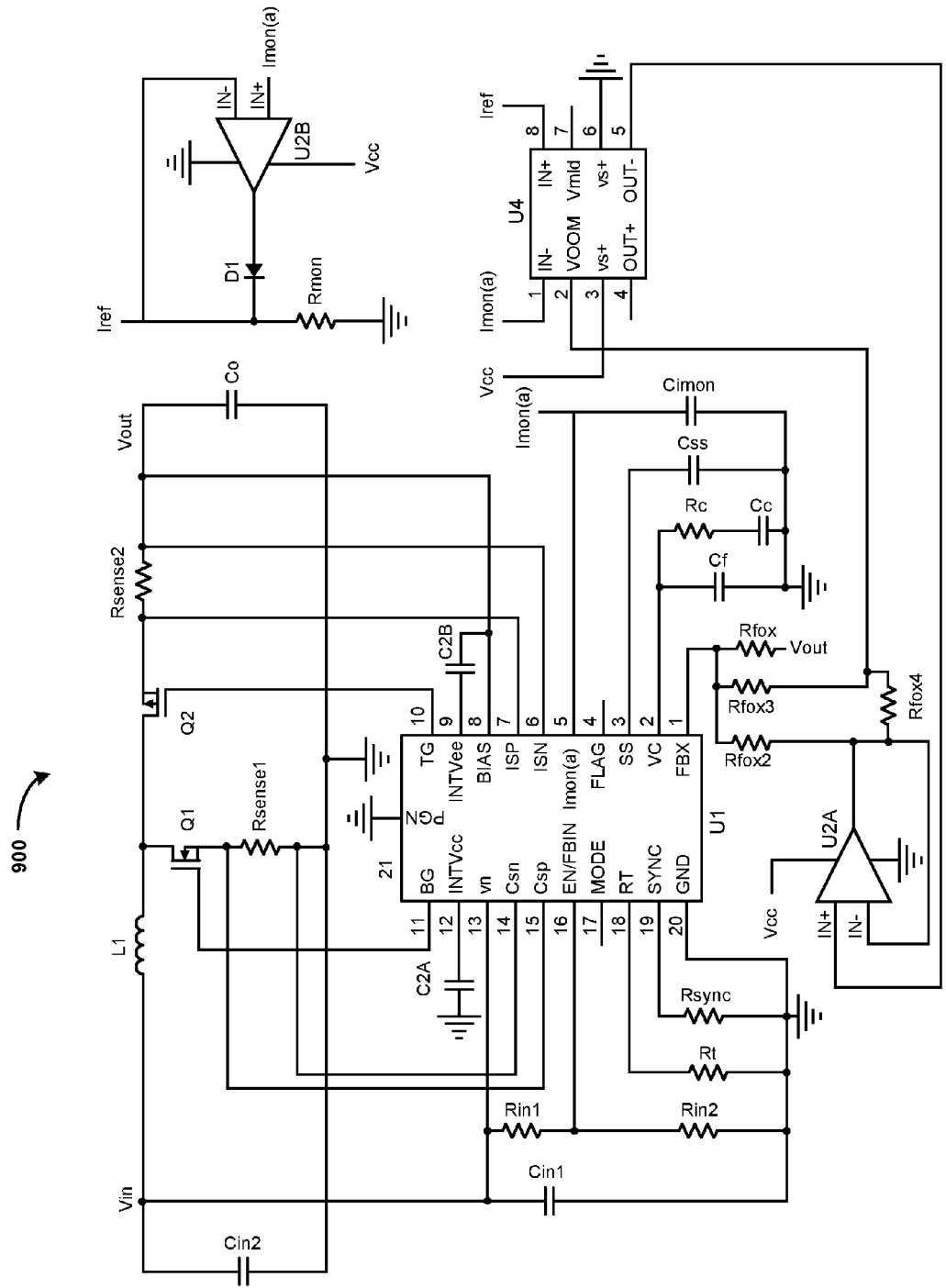
FIG. 9A is a simplified schematic diagram of an exemplary implementation of a single DC to DC converter module, for implementing embodiments of the present disclosure.

FIG. 9A is a simplified schematic diagram of an exemplary implementation of a single DC to DC converter module 900, for implementing embodiments of the present disclosure. A multiple input, single output DC to DC converter system would use multiple DC to DC converter modules 900 coupled in parallel to supply power to a load.

Figure 9B:
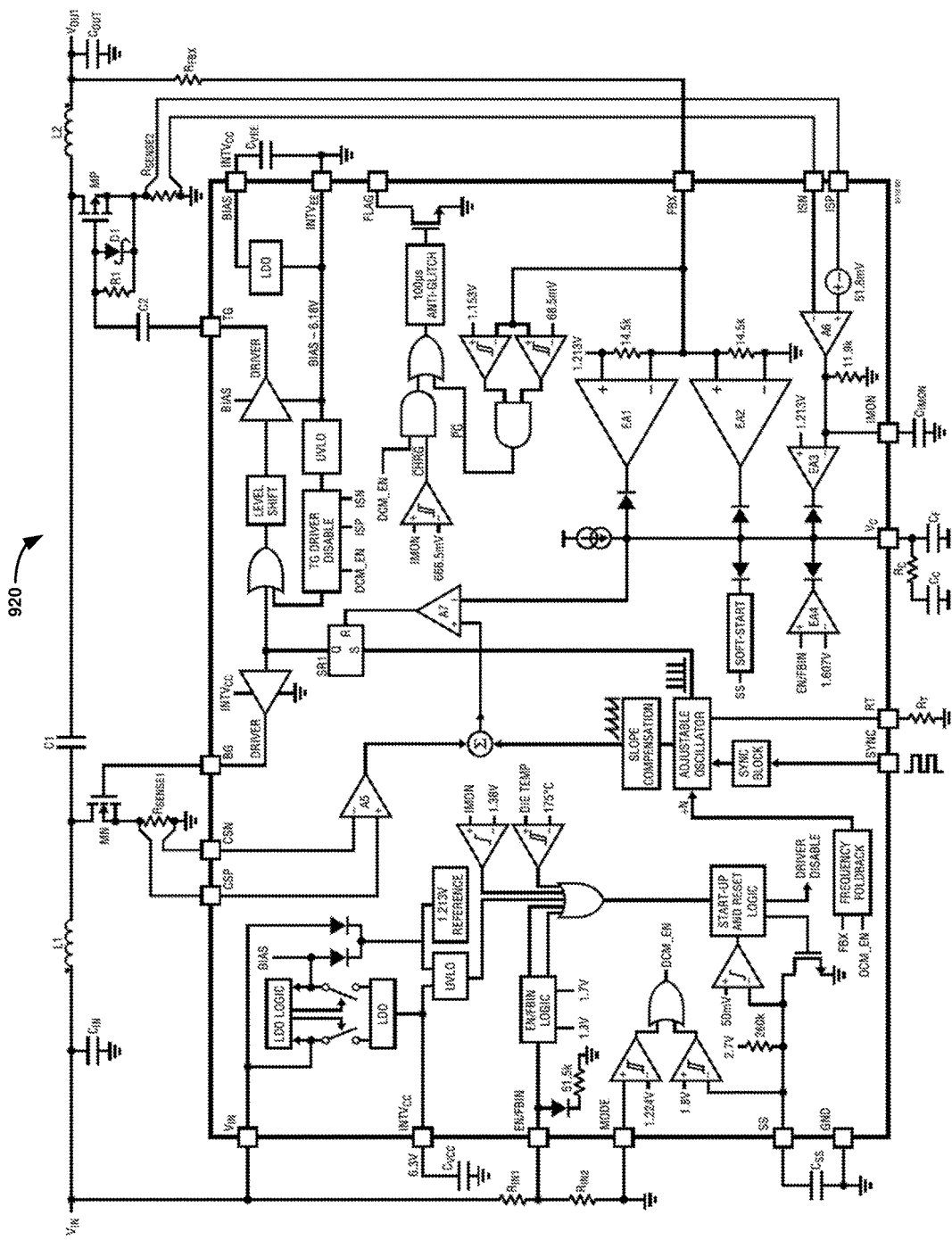
FIG. 9B is a simplified block diagram of the integrated circuit U1 of the DC to DC converter module, for implementing embodiments of the present disclosure.

The DC to DC converter system 900 is uses an integrated circuit U1. In an exemplary implementation, U1 is an LT 8710 pulse width modulated DC to DC controller, manufactured by Linear Technology Corporation of Milpitas, Calif. FIG. 9B is a simplified block diagram 920 of the integrated circuit U1 of the DC to DC converter module 900, for implementing embodiments of the present disclosure. It should be understood that other switching controllers could be used in other implementations. The integrated circuit U1 varies the output of transistors Q1 and Q2 to vary the output power of the DC to DC converter module 900.

Capacitor Cin1 is an input capacitor providing voltage filtering to couple high-frequency noise to ground. High-frequency noise may occur in the power applied to the Vin node. The high-frequency noise is a frequency higher than the selected switching frequency of the DC to DC converter module 900. Capacitor Cin2 is an input capacitor and provides voltage filtering for the input voltage applied to the Vin node. Capacitors C2A and C2B are filtering capacitors for filtering high-frequency noise to ground and pins 12 and 9, respectively, of U1.

Resistors Rin1 and Rin2 form a resistance voltage divider. Integrated circuit U1 utilizes the voltage provided by the Rin1 and Rin2 voltage divider for two purposes: to power U1 and as a reference voltage for the power applied to the Vin node.

Resistor Rt is a timing resistor used for setting the switching frequency of U1. The switching frequency of U1 corresponds to the resistance of timing resistor Rt. Rsync is a resistor provided to cancel or ground a synchronizing control input on pin 19 of U1. In an implementation where the switching frequency of U1 is synchronized with one or more other DC to DC converter modules, pin 19 of U1 could be coupled to a common reference signal, such as a clock, or other synchronizing signal that is common to each of the DC to DC converter modules. In such an implementation of the synchronized DC to DC modules, the timing resistor Rt could be excluded as the switching frequency of U1 would be set by the synchronizing signal on pin 19 of U1.

Inductor L1 stores energy when transistor Q1 is conducting and discharges energy when transistor Q1 is not conducting and transistor Q2 is conducting. Resistor Rsense1 is a sense resistor for sensing the current flowing through transistor Q1 when transistor Q1 is conducting. The sensed current flowing through resistor Resnse1, e.g., voltage drop across resistor Rsense1, is coupled to pins 14 and 15 of U1. Resistor Rsense2 is a sense resistor for sensing the current flowing through transistor Q2 when transistor Q2 is conducting. The sensed current flowing through resistor Resnse2, e.g., voltage drop across resistor Rsense2, is coupled to pins 7 and 7 of U1. Capacitor Cimon is a filter capacitor for filtering out high frequency noise on the Iref node.

Capacitor Css provides a soft start control input to the DC to DC converter module 700. On initial power on, the voltage on capacitor Css is relatively low, resulting in a relatively low output voltage of the DC to DC converter module 900. Capacitor Css continues to charge over time as the DC to DC converter module 900 is outputting power. The output voltage of the DC to DC converter module 900 corresponds to the voltage across capacitor Css.

Resistor Rc, capacitor Cc and capacitor Cf form an RC filtering network. Varying the values of the resistor Rc, capacitor Cc and capacitor Cf provide fine tuning of the switching frequency response of the DC to DC converter module 900. Resistors Rfox, Rfox2, Rfox3 and Rfox4 form a voltage divider network used as a feedback signal to the feedback pin 1 of U1.

Iref is the reference current value selected, as described in FIG. 5 above. The Iref can be the output current of a selected DC to DC converter of the multiple DC to DC converters coupled in parallel to share the load. Alternatively, Iref can be an output current level independent of one of the DC to DC converters e.g., a selected current level.

Op amp U2A compares the present output Imon(a) of U1 with the reference current Iref. If the output current Imon(a) of U1 is less than Iref, then U2A provides an increase output voltage signal through the Rfox, Rfox2, Rfox3 and Rfox4 voltage divider network to the feedback pin 1 of U1 to cause U1 to increase the output current Imon(a) of U1.

If the output current Imon(a) of U1 is greater than Iref, then U2A provides a decrease output voltage signal through the Rfox, Rfox2, Rfox3 and Rfox4 voltage divider network to the feedback pin 1 of U1 to cause U1 to decrease the output current Imon(a) of U1.

If the output current Imon(a) of U1 is equal to Iref, then U2A provides an unchanged output voltage signal through the Rfox, Rfox2, Rfox3 and Rfox4 voltage divider network to the feedback pin 1 of U1 to cause U1 to not change the output current Imon(a) of U1.

U4 acts as a current source whose output is based on the difference between Imon(a) output from U1 and Iref and the difference is input to U3.

The switching frequency of the DC to DC converter module 900 can be up to about 750 kHz. Higher switching frequencies are possible as well, but not necessary. The switching frequency of the DC to DC converter module 900 can be as low as a 100 Hz. Thus, the switching frequency of the DC to DC converter module 900 can be between about 100 Hz and about 750 kHz. In one implementation, the switching frequency of the DC to DC converter module 900 can be 400 kHz. The higher switching frequencies allow use of smaller value inductors and capacitors. The higher switching frequencies also provide faster response to changes in current demands of the load and faster response to changes in current produced by other DC to DC converter modules that are used together with the DC to DC converter module 900 to supply power to the load. The advantages of the higher switching frequency of the DC to DC converter module 900 have to be balanced with the increase in switching losses as the switching frequency increases.

Figure 9C:
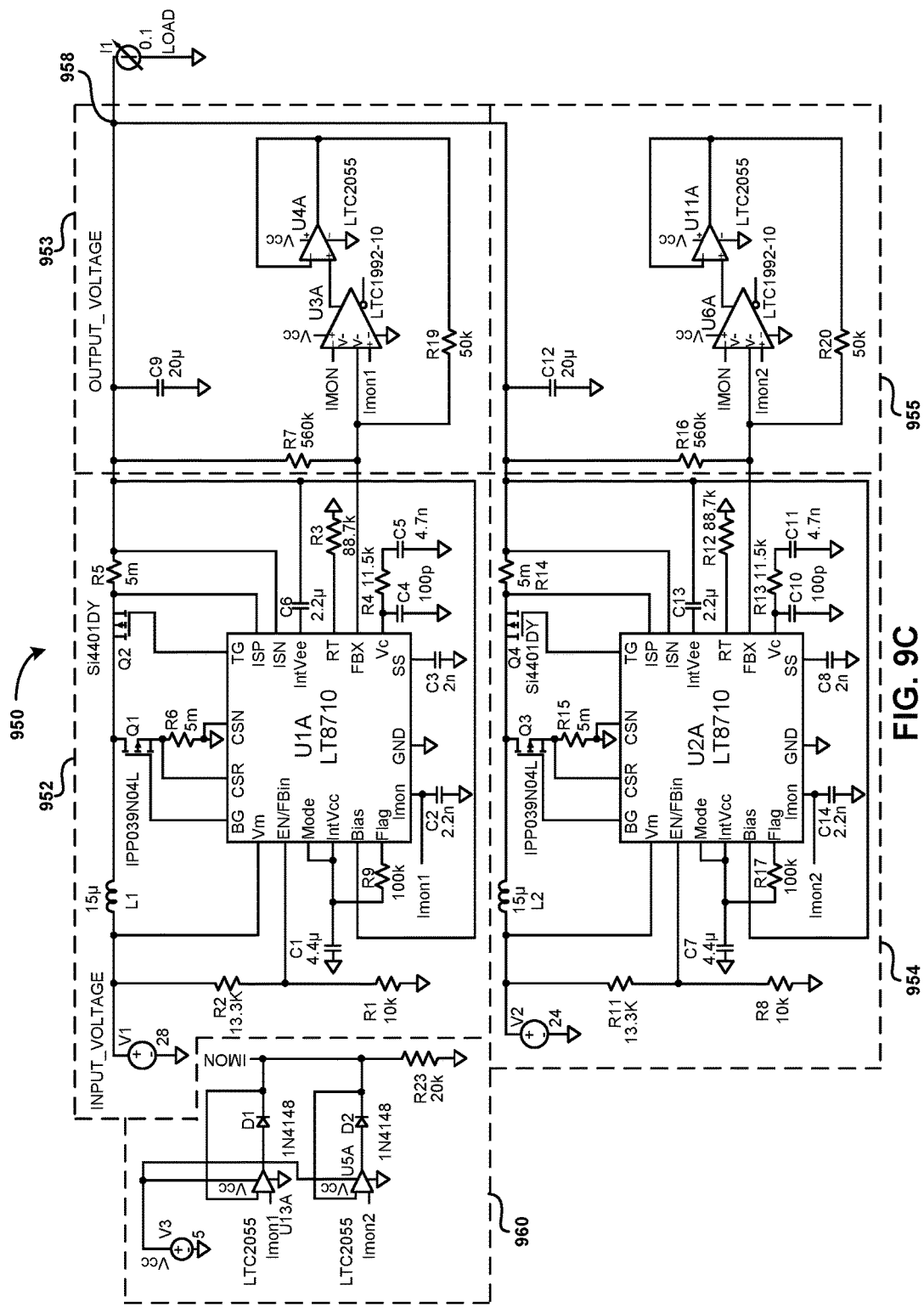
FIG. 9C is a simplified schematic diagram of an exemplary implementation of a two input, single output DC to DC converter system, with two DC power sources, for implementing embodiments of the present disclosure.

FIG. 9C is a simplified schematic diagram of an exemplary implementation of a two input, single output DC to DC converter system 950, with two DC power sources, for implementing embodiments of the present disclosure. The multiple input single output DC to DC converter system 950 includes two DC to DC converters 952 and 954, two monitoring circuits 953 and 955 and an output current comparator 960 for selecting a reference current Iref. The DC to DC converters 952 and 954 include controllers U1A, U2A, respectively for controlling the power output of the respective output transistors Q1, Q2 and Q3,Q4. The monitoring circuits 953 and 955 include comparators U3A and U6A for comparing the respective output current Imon1, Imon2 of the DC to DC converter 952 and 954 to a reference current Iref.

The output current comparator 960 compares the respective output current Imon1, Imon2 of the DC to DC converters 952 and 954 to select a reference current Iref. The selected reference current is then used by the monitoring circuits 953 and 955 to compare the respective output current Imon1, Imon2 and provide corresponding feedback signals to controllers U1A, U2A. By way of example, when the Imon1>Iref, the feedback signal provided to controller U1A to reduce the output current Imon1 produced by DC to DC converter 952. Similarly, when the Imon2>Iref, the feedback signal provided to controller U2A to reduce the output current Imon2 produced by DC to DC converter 954. Conversely, when the Imon1<Iref, the feedback signal provided to controller U1A to increase the output current Imon1 produced by DC to DC converter 952. Similarly, when the Imon2<Iref, the feedback signal provided to controller U2A to increase the output current Imon2 produced by DC to DC converter 954.

It is significant to note that the output currents Imon1 and Imon2 of the DC to DC converters 952 and 954, respectively, is not turned off or reduced to zero, but is instead adjusted lower or higher according to the difference with the Iref determined by the monitoring circuits 953 and 955. This allows the DC to DC converters 952 and 954 to more evenly and simultaneously share the current demand of the load on the combined single output node 958 of the two input, single output DC to DC converter system 950.

It should be noted that while FIG. 9C shows a two input, single output DC to DC converter system 950, additional DC to DC converters and monitoring circuits could be provided and coupled in similar fashion to the single output node 958 and each of the additional DC to DC converters could share the current demand of the load with the DC to DC converters 952 and 954.

Figure 10:
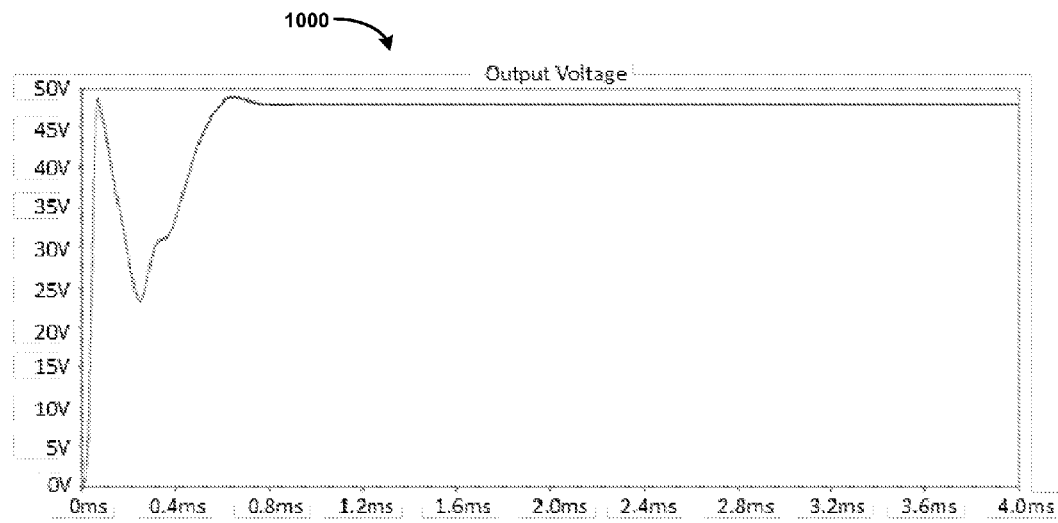
FIGS. 10-16 are graphical representations of various signals within the multiple input single output DC to DC converter system, as described above, for implementing embodiments of the present disclosure.

FIGS. 10-16 are graphical representations of various signals within the multiple input single output DC to DC converter system 200 as described above, for implementing embodiments of the present disclosure. Referring now to FIG. 10, which shows an output voltage output from the single output 214 of the multiple input, single output DC to DC converter system 200 across the large voltage range of between 0 volts and the expected output voltage range of 48 volts. During the initial power up phase, up to about 0.8 milliseconds, the output voltage varies considerably by about 50%. However, after the initial power up phase at about 0.8 milliseconds, the output voltage settles to a very consistent level as shown in more detail in FIG. 11.

Figure 11:
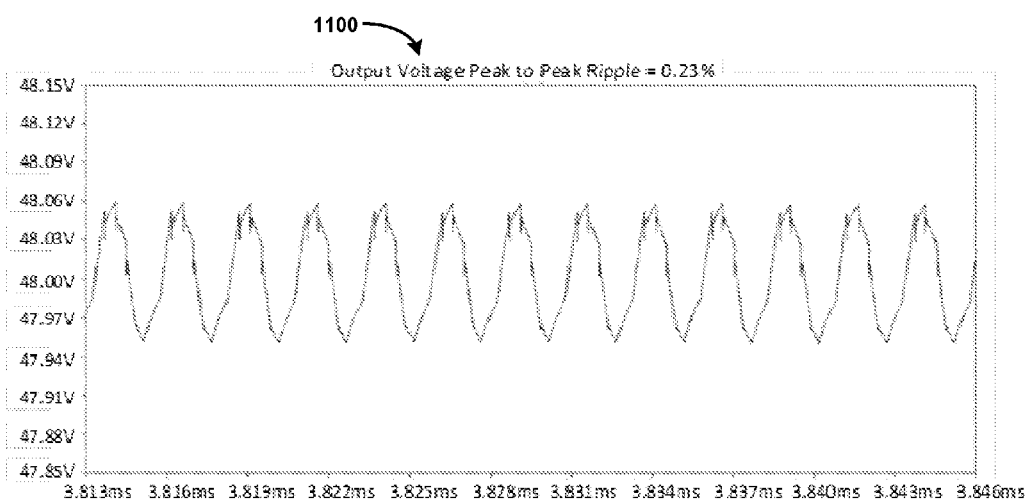

Referring now to FIG. 11, which shows a more detailed view of the output voltage output from the single output 214 of the multiple input, single output DC to DC converter system 200 across the a very small voltage range centered on the output voltage of 48 volts. As shown the voltage varies between about 47.94 volts and about 48.06 volts, i.e., 48+/−0.06 volts or 48 volts+/−0.23%. The frequency of the voltage+/−0.06 volts peaks is approximately 400 MHz, in this implementation. It should be noted that the frequency and the amplitude of the voltage peaks can be selected in other implementations, but in general it is desirable that the frequency of this ripple be kept high and while the amplitude kept as low as possible to yield a small value output capacitor and improve efficiency of the DC-DC converter.

Figure 12:
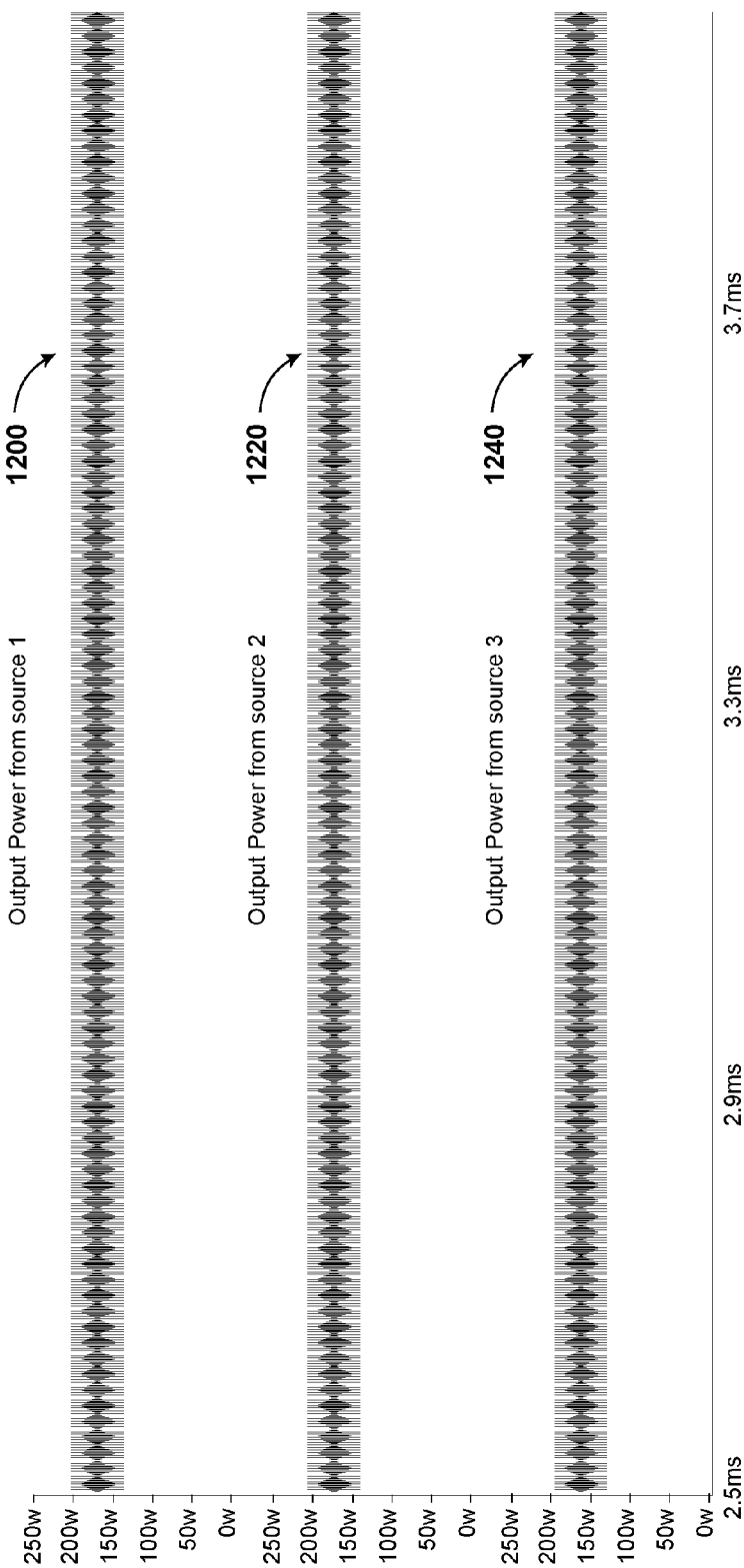

Referring now to FIG. 12, which shows the output power from each one of the DC power sources compared to time. The first graph 1200 illustrates the output power for the first DC power source 102A applied to input 208A of the converter 210. The second graph 1220 illustrates the output power for the second DC power source 102B applied to input 208B of the converter 210. The third graph 1240 illustrates the output power for the third DC power source 102C applied to input 208C of the converter 210. Each of the graphs 1200, 1220, 1240 shows the power output from each one of the respective DC power sources 102A-C stays within a range of about 140 to about 190 W in this implementation. The variation in the illustrated waveforms are due to the adjustment of the duty cycle of the respective DC to DC converter modules 304A-C. It should be noted that while only three DC power sources are shown in FIG. 12, fewer or more than three DC power sources can be applied as described elsewhere herein.

Figure 13:
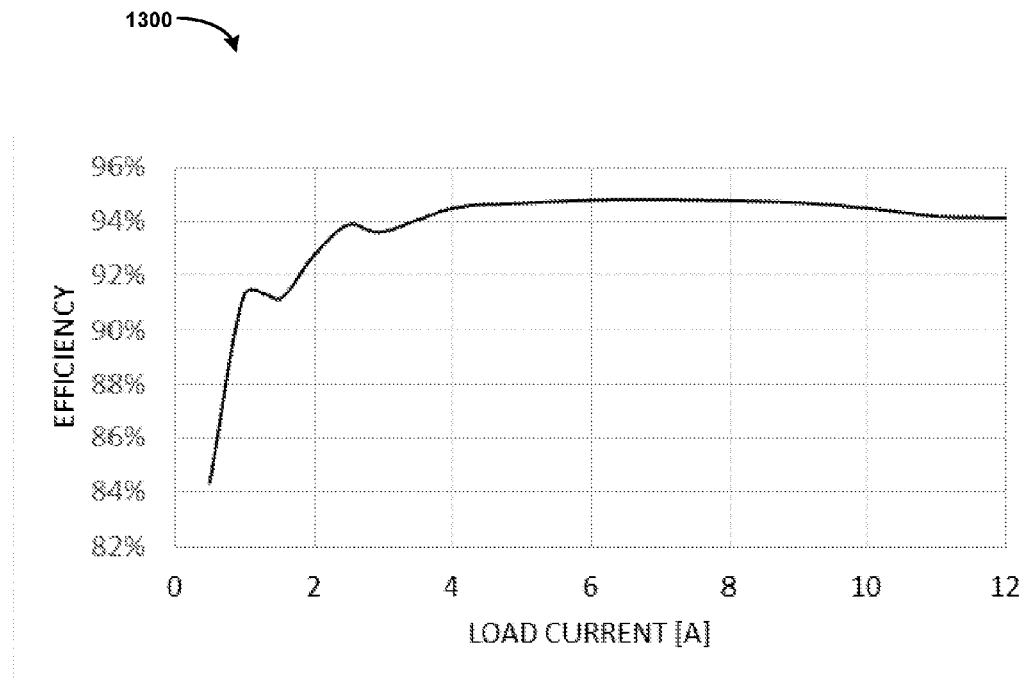

Referring now to FIG. 13, which illustrates a graph 1300 of the efficiency of the multiple input, single output DC to DC converter system 200 with substantially equal, 24 volt output voltages of each one of the multiple DC power sources 102A-n, in one implementation. At maximum, steady state current flow of 12 amps, the input voltages applied to inputs 208A-n remain stable at about 94% of the applied 24 volts. Between about 30 percent max current flow (about 4 amps) and about 85 percent max current flow (about 10 amps), the input voltages very slightly higher to about 94.5% of the applied 24 volts. Below about 30 percent max current flow, the input voltages very greatly down to as low as about 84 percent of the applied 24 volts. In other implementations, the maximum current flow can be higher or lower depending upon the load requirements for the multiple input single output DC to DC converter system 200.

Figure 14:
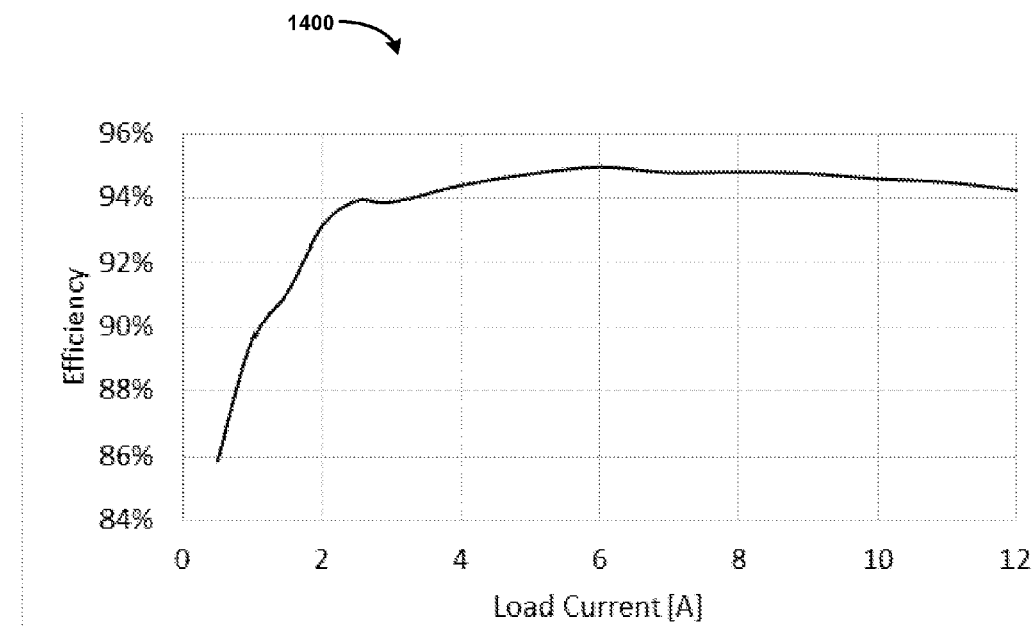

Referring now to FIG. 14, which illustrates a graph 1400 of the efficiency of the multiple input, single output DC to DC converter system 200 with substantially equal. Note that the efficiency shown here is referred to as the total efficiency determined by the total output power divided by the total input powers from all four modules. FIG. 14 illustrates applying 22V, 24V, 26V and 28V where FIG. 13 illustrates all input voltages at the same 24V.

Figure 15:
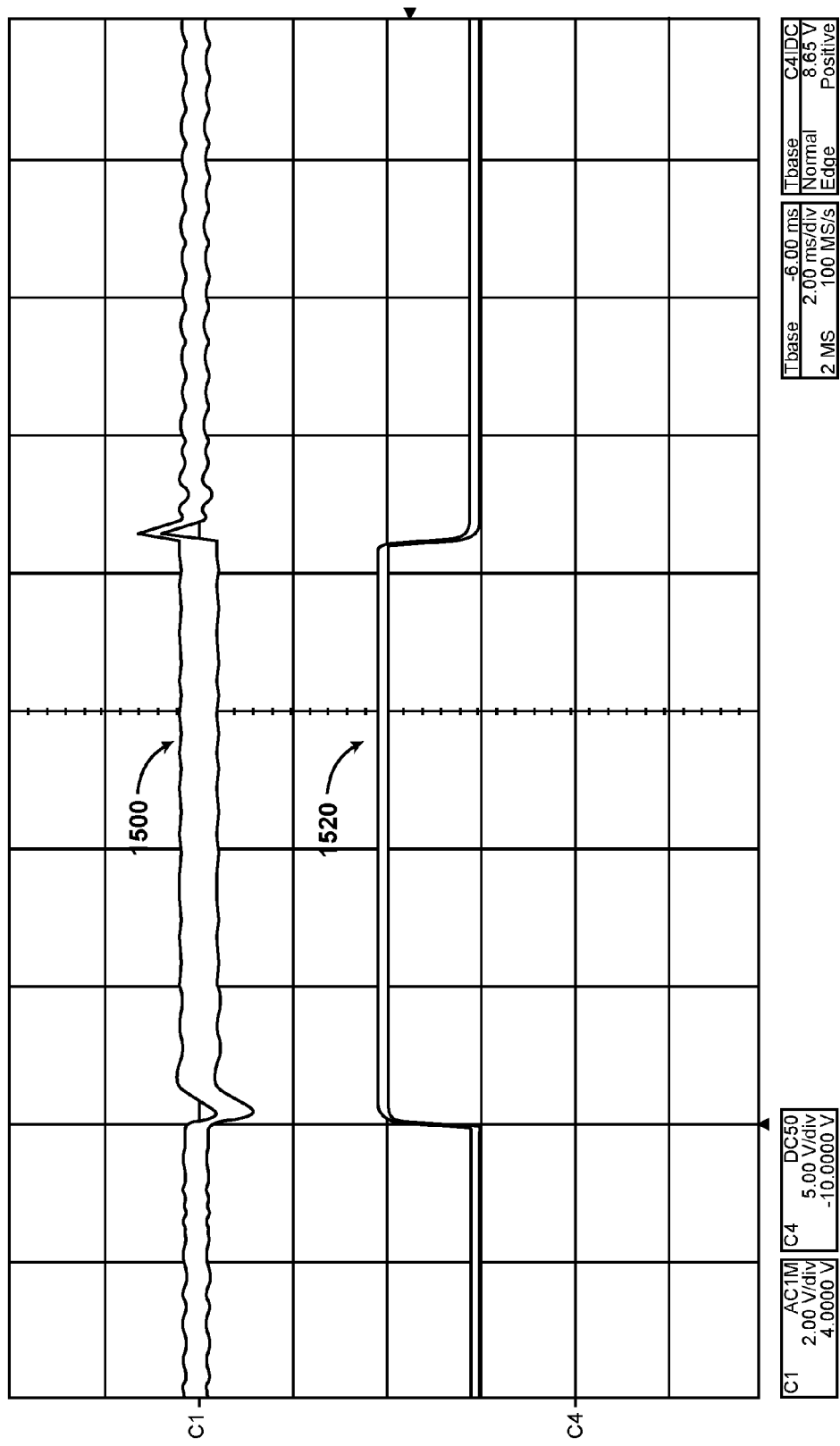

Referring now to FIG. 15, which illustrates graphs 1500, 1520 of the step response to different loads on the multiple input, single output DC to DC converter system 200. Graph 1500 illustrates the output voltage waveform output from the single output 214. Graph 1520 illustrates the output current waveform output from the single output 214. The illustrated time base is 2 ms per division for both waveforms 1500 and 1520. The vertical scale for waveform 1500 is 2V per division. The vertical scale for waveform 1500 is 5V per division, which corresponds to a 5 Ampere per division output current. As shown in the graphs, the step up in load increases the load on the single output 214 from about 5 amps to about 10 amps and then there is a step down in load which decreases the load from about 10 amps to about 5 amps.

During the step up in load, from about 5 amps to about 10 amps, the output current adjusts quite cleanly over a period of about 0.2 ms. Similarly, during the step down in load, from about 10 amps to about 5 amps, the output current adjusts quite cleanly over a period of about 0.2 ms.

During the step up in load, from about 5 amps to about 10 amps, the output voltage drops slightly to about 1.0V over a period of about 1 ms. Similarly, during the step down in load, from about 10 amps to about 5 amps, the output voltage spike slightly to about 1.0V over a period of about 1 ms.

The response time of the DC to DC converter depends on several factors. The components in the DC to DC converter circuit are selected for faster response such as using the smallest inductive value inductors and lowest capacitance output capacitors to achieve the desired rapid response time results. As described herein, the controller U1 described above uses a current mode control. However, it should be understood that in a different implementation, the controller U1 or a similar controller could use a voltage control mode with similar responsiveness and effectiveness.

Figure 16:
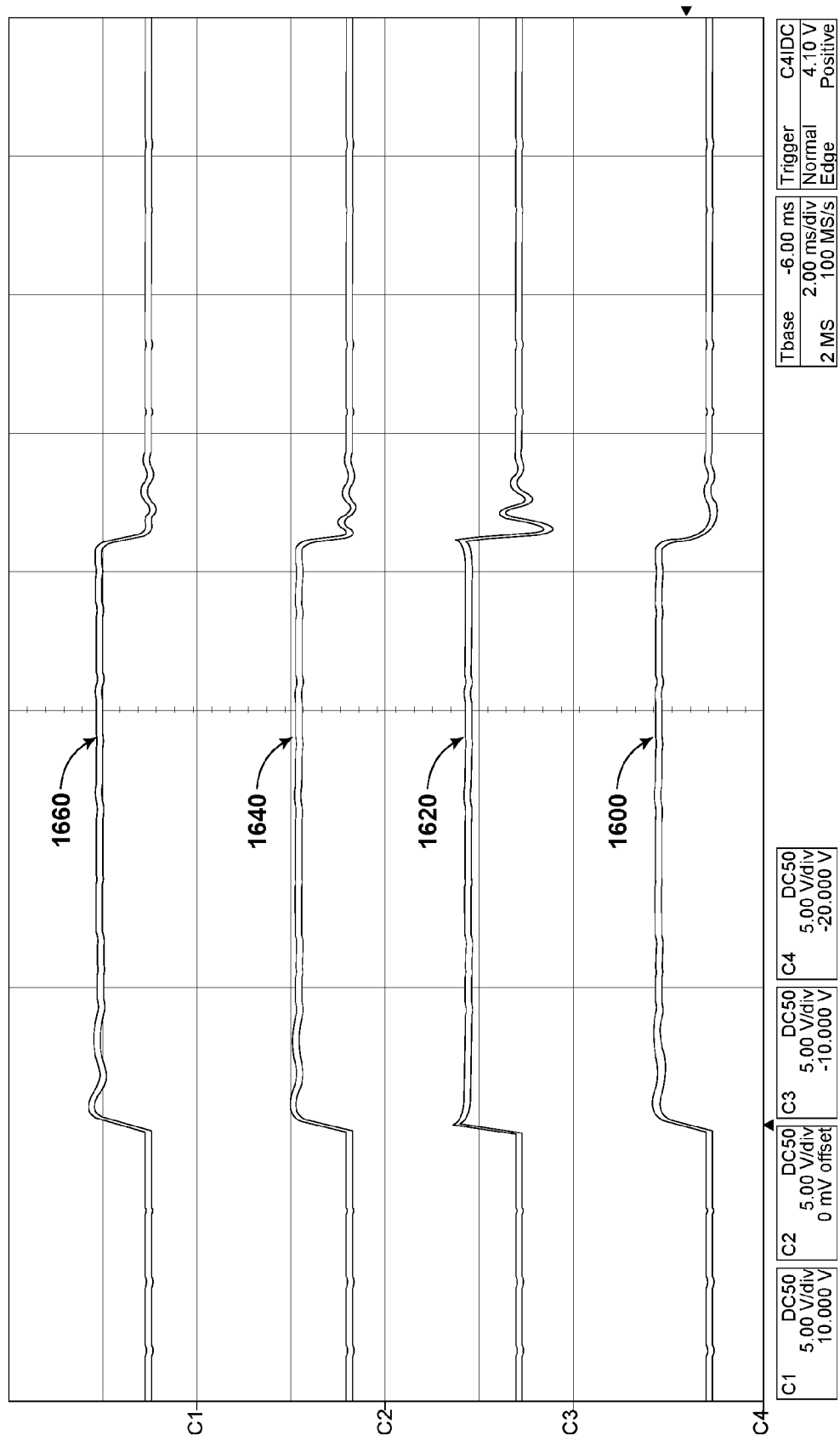

Referring now to FIG. 16, which illustrates graphs 1600, 1620, 1640, 1660 of the step response of each one of the DC power sources 102A-n in response to different loads on the multiple input, single output DC to DC converter system 200. Graph 1600 illustrates the output current waveform output from the first DC power source 102A. Graph 1620 illustrates the output current waveform output from the second DC power source 102B. Graph 1640 illustrates the output current waveform output from the third DC power source 102C. Graph 1660 illustrates the output current waveform output from a fourth DC power source 102n. As shown in FIG. 16, the time base is 2 ms per division and the vertical scale is 5V per division which corresponds to 10A per division for the output currents being measured. As shown in the graphs, the step up in load increases the load on the single output 214 from about 5 amps to about 10 amps and then there is a step down in load which decreases the load from about 10 amps to about 5 amps.

During the step up in load, from about 5 amps to about 10 amps, the output current of each of the DC power sources 102A-n adjusts quite cleanly over a period of about 1.0 ms to about 2.0 ms. During the step down in load, from about 10 amps to about 5 amps, the output current of each of the DC power sources 102A-n oscillates slightly over a period of about 2.0 ms. The oscillations can be minimized with fine tuning.

With the above embodiments in mind, it should be understood that the disclosure may employ different parameters in different components operate within different ranges of operations. However, the embodiments and implementations described herein can still be applied in different parameters. For example, the above implementations are limited to a fairly low power of about 600 watts output. However the system can easily be scaled or duplicated to produce more than 600 watts output.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A method of balancing a direct current load across a plurality of direct current power sources comprising:
   receiving a plurality of direct current inputs to a corresponding plurality of inputs to a multiple input single output converter, wherein each one of the plurality of inputs corresponds to and is coupled to each one of a plurality of DC to DC converter modules, the each one of the plurality of DC to DC converter modules having a control signal line coupled to a current source connected to a mid-point of a feedback voltage divider network;
   comparing an output current of the each one of the plurality of DC to DC converter modules to a reference current;
   adjusting the output current of at least one of the plurality of DC to DC converter modules including:
   increasing the output current of the at least one of the plurality of DC to DC converter modules when the output current of the at least one of the plurality of DC to DC converter modules is less than the reference current by applying a push current feedback signal from the current source to the mid-point of the feedback voltage divider network;
   decreasing the output current of the at least one of the plurality of DC to DC converter modules when the output current of the at least one of the plurality of DC to DC converter modules is greater than the reference current by applying a pull current feedback signal to the current source from the mid-point of the feedback voltage divider network; and
   making no change to the output current of the at least one of the plurality of DC to DC converter modules when the output current of the at least one of the plurality DC to DC converter modules is equal to the reference current by not applying the push current feedback signal and the pull current feedback signal from or to the current source to or from the mid-point of the feedback voltage divider network;
   combining the output currents of the plurality of DC to DC converter modules in a single output current; and
   outputting the single output current.

2. The method of claim 1, wherein adjusting the output current of the at least one of the plurality of DC to DC converter modules includes adjusting the output currents of more than one of the plurality of DC to DC converter modules substantially simultaneously.

3. The method of claim 1, wherein the reference current is equal to a preselected reference current.

4. The method of claim 1, wherein the reference current is equal to a proportion of the single output current.

5. The method of claim 4, wherein the proportion of the single output current is equal to the single output current divided by a total number of the plurality of direct current inputs received in the multiple input single output converter.

6. The method of claim 1, wherein comparing the output current of each one of the plurality of DC to DC converter modules includes identifying a highest output current output from the plurality of DC to DC converter modules and wherein the reference current is equal to the highest output current from the plurality of DC to DC converter modules.

7. The method of claim 1, wherein increasing the output current of the at least one of the plurality of DC to DC converter modules when the output current of the at least one of the plurality of DC to DC converter modules is less than the reference current includes increasing a duty cycle of at least one portion of the at least one of the plurality of DC to DC converter modules.

8. The method of claim 1, wherein decreasing the output current of the at least one of the plurality of DC to DC converter modules when the output current of the at least one of the plurality of DC to DC converter modules is greater than the reference current includes decreasing a duty cycle of at least one portion of the at least one of the plurality of DC to DC converter modules.

9. The method of claim 1, wherein the plurality of direct current inputs includes at least three direct current inputs and the plurality of DC to DC converter modules includes a corresponding at least three DC to DC converter modules.

10. A multiple direct current input, single direct current output converter system comprising:
   a plurality of inputs corresponding to and coupled to a plurality of direct current input sources;
   a plurality of DC to DC converter modules corresponding to and coupled to each one of the plurality of inputs;
   an output current sharing controller having a control signal line coupled to each one of the plurality of DC to DC converter modules, the each one of the plurality of DC to DC converter modules having a current source connected to a mid-point of a feedback voltage divider network, the output current sharing controller including:

a comparator for comparing an output current from the each one of the plurality of DC to DC converter modules to a reference current; and an adjusting circuit for determining a control signal for adjusting the output current of at least one of the plurality of DC to DC converter modules, wherein adjusting the output current of the at least one of the plurality of DC to DC converter modules includes:

increasing the output current of the at least one of the plurality of DC to DC converter modules when the output current of the at least one of the plurality of DC to DC converter modules is less than the reference current by applying a push current feedback signal from the current source to the mid-point of the feedback voltage divider network;

decreasing the output current of the at least one of the plurality of DC to DC converter modules when the output current of the at least one of the plurality of DC to DC converter modules is greater than the reference current by applying a pull current feedback signal to the current source from the mid-point of the feedback voltage divider network; and making no change to the output current of the at least one of the plurality of DC to DC converter modules when the output current of the at least one of the plurality DC to DC converter modules is equal to the reference current by not applying the push current feedback signal and the pull current feedback signal from or to the current source to or from the mid-point of the feedback voltage divider network; and a combining module combining a plurality of outputs from the each one of the plurality of DC to DC converter modules into a single output.

11. The system of claim 10, wherein the reference current is equal to a preselected current.

12. The system of claim 10, wherein the reference current is equal to a highest output current of the plurality of DC to DC converter modules.

13. The system of claim 10, wherein the adjusting circuit adjusts more than one of the plurality of DC to DC converter modules substantially simultaneously.

14. The system of claim 10, wherein the control signal increases the output current of the at least one of the plurality of DC to DC converter modules when the output current of the at least one of the plurality of DC to DC converter modules is less than the reference current including increasing a duty cycle of at least one portion of the at least one of the plurality of DC to DC converter modules.

15. The system of claim 10, wherein the control signal decreases the output current of the at least one of the plurality of DC to DC converter modules when the output current of the at least one of the plurality of DC to DC converter modules is greater than the reference current including decreasing a duty cycle of at least one portion of the at least one of the plurality of DC to DC converter modules.

* * * * *